United States Patent [19]

Pötz et al.

[11] Patent Number: 5,022,437
[45] Date of Patent: Jun. 11, 1991

[54] HOLLOW PLUG FOR BLOCKING A HEAT EXCHANGER TUBE

[75] Inventors: Franz Pötz; Dieter Daum, both of Heppenheim, Fed. Rep. of Germany

[73] Assignee: Brown Boveri Reaktor GmbH, Mannheim, Fed. Rep. of Germany

[21] Appl. No.: 453,066

[22] Filed: Dec. 11, 1989

Related U.S. Application Data

[63] Continuation of Ser. No. 191,215, May 6, 1988, abandoned.

[30] Foreign Application Priority Data

May 15, 1987 [DE] Fed. Rep. of Germany ....... 3716328

[51] Int. Cl.$^5$ ............................................. F16L 55/00
[52] U.S. Cl. ......................................... 138/89; 165/71; 376/203; 376/451
[58] Field of Search .................... 138/89, 90; 165/71, 165/76; 220/240, 326; 376/203, 204, 451

[56] References Cited

U.S. PATENT DOCUMENTS

| 1,886,419 | 11/1932 | Oberhuber | 138/89 |
| 3,201,158 | 8/1965 | Meripol | 138/89 |
| 3,942,560 | 3/1976 | Deaver | 138/89 |
| 4,591,068 | 5/1986 | Tolino et al. | 138/89 |
| 4,598,738 | 7/1986 | Weber et al. | 138/89 |
| 4,771,810 | 9/1988 | Ermold et al. | 138/89 |

FOREIGN PATENT DOCUMENTS

| 344211 | 7/1978 | Austria . |
| 0034549 | 8/1981 | European Pat. Off. . |
| 0113080 | 7/1984 | European Pat. Off. . |
| 0044982 | 10/1984 | European Pat. Off. . |
| 0122610 | 10/1984 | European Pat. Off. . |
| 0181250 | 5/1986 | European Pat. Off. . |
| 0248728 | 12/1987 | European Pat. Off. . |
| 1238027 | 6/1960 | France . |
| 236584 | 6/1986 | German Democratic Rep. . |
| 2079204 | 1/1982 | United Kingdom . |

Primary Examiner—James E. Bryant, III
Attorney, Agent, or Firm—Herbert L. Lerner; Laurence A. Greenberg

[57] ABSTRACT

A hollow plug for blocking a heat exchanger tube includes an expansion zone expanded into a frictional connection with the heat exchanger tube. An outer surface in the expansion zone has a first part with a relatively greater surface hardness and a second part with a relatively lesser surface hardness. The first part has a greater surface hardness than the heat exchanger tube. The second part has a lesser surface hardness than the heat exchanger tube. The first part also has a relief pattern.

9 Claims, 5 Drawing Sheets

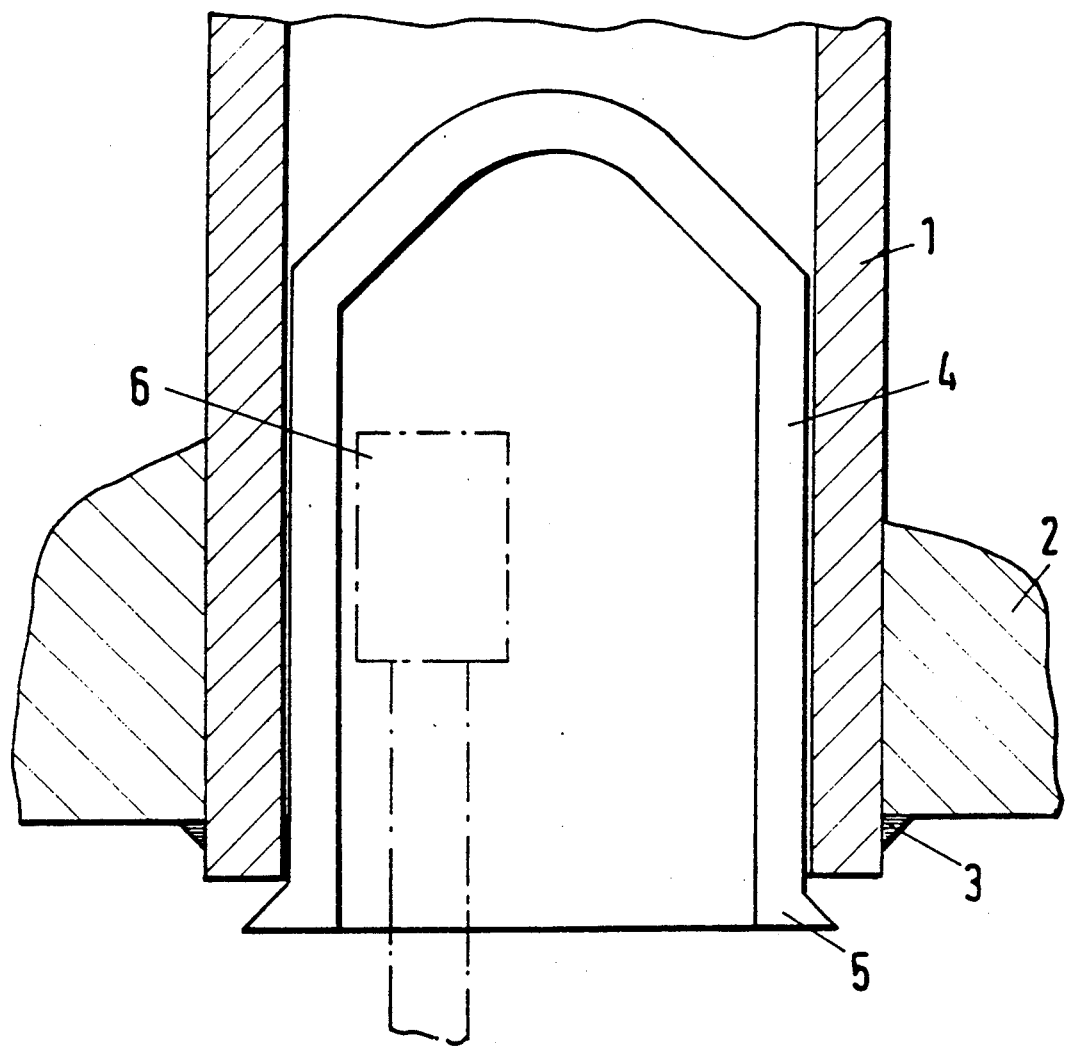

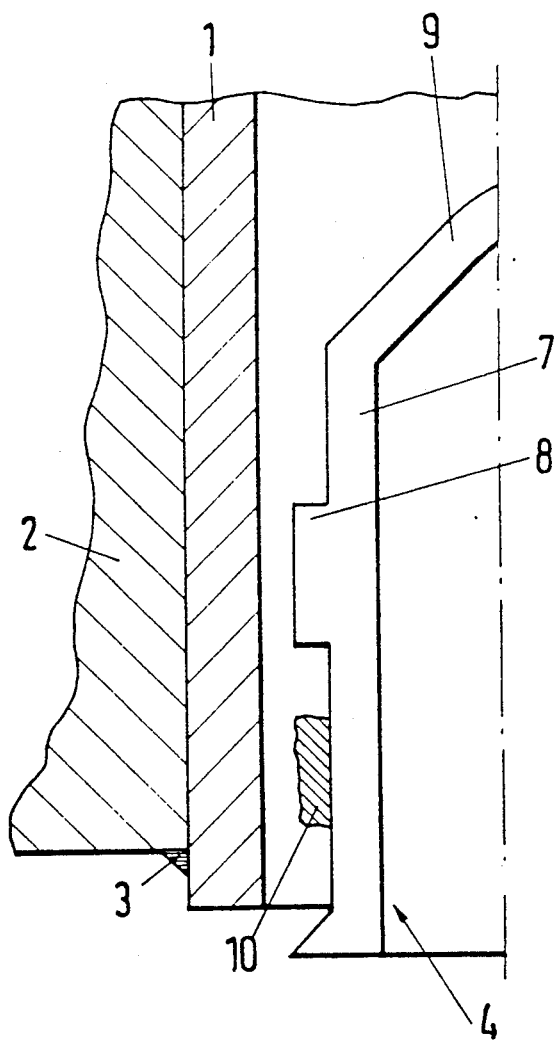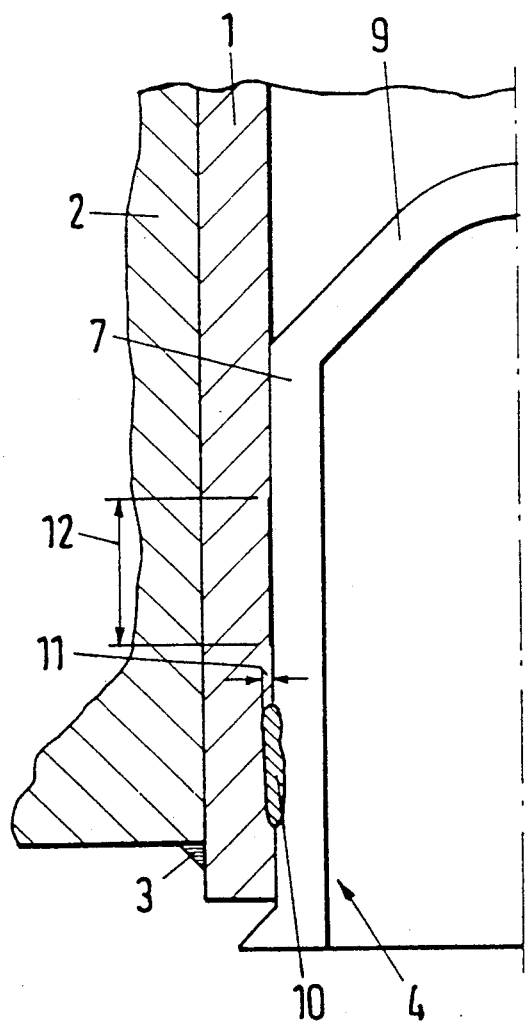

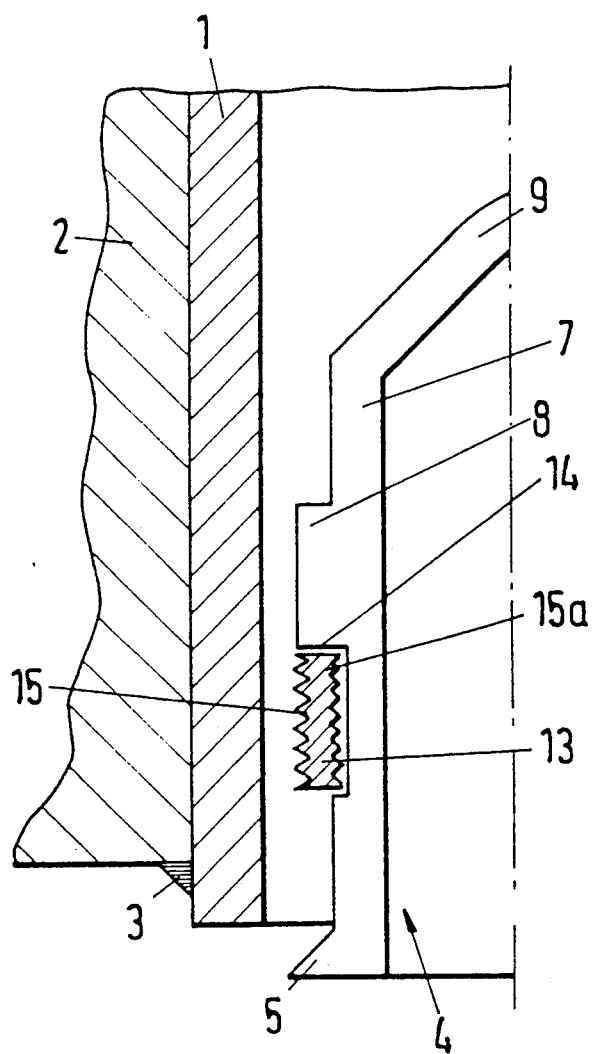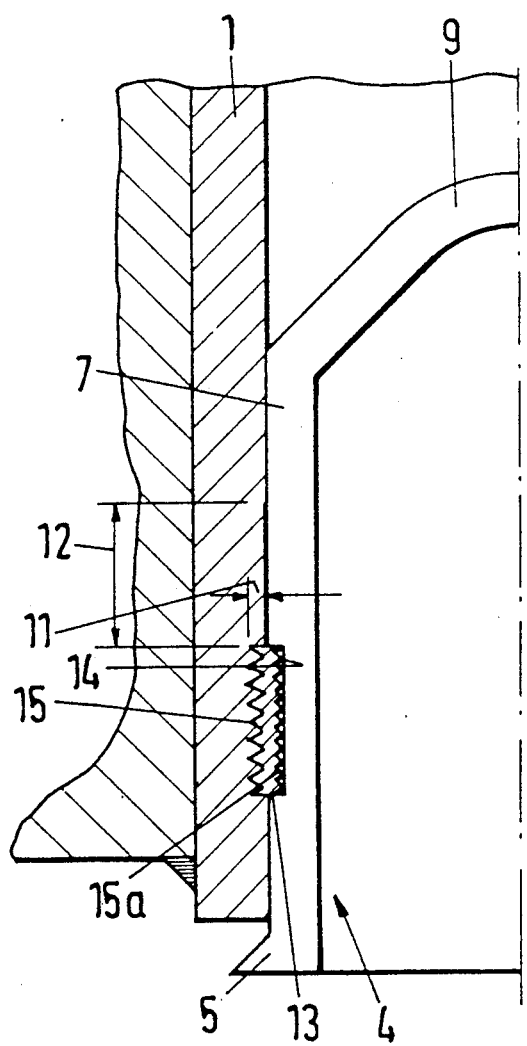

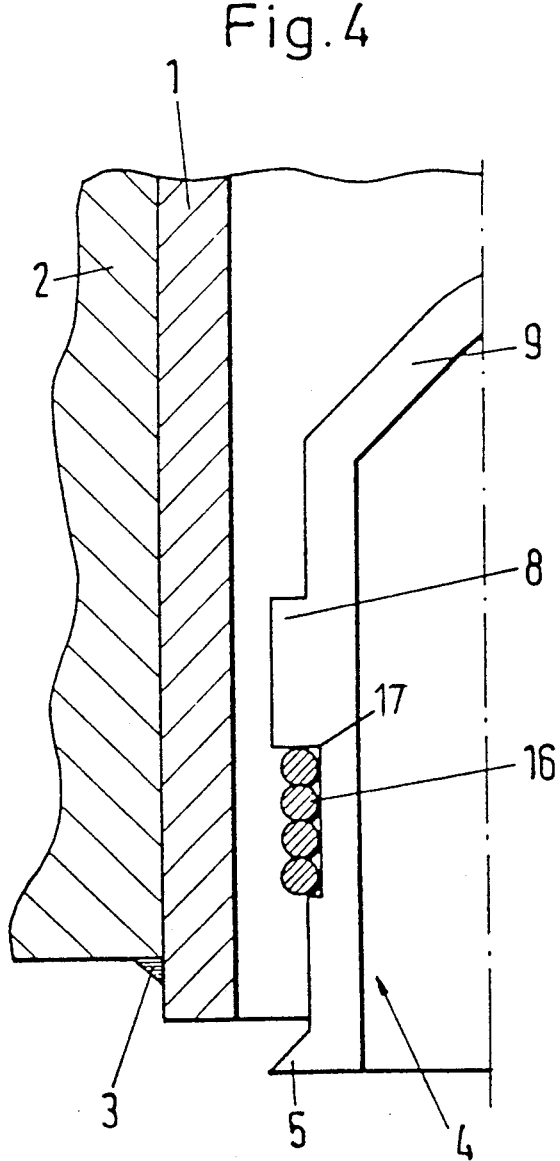
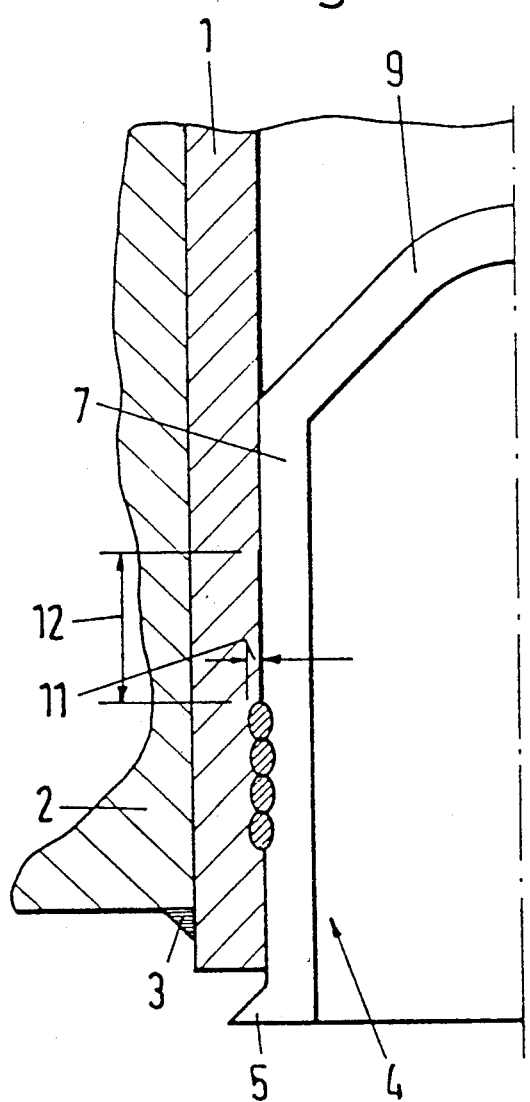

HOLLOW PLUG FOR BLOCKING A HEAT EXCHANGER TUBE

This application is a continuation of application Ser. No. 191,215, filed May 6, 1988, now abandoned.

Specification:

The invention relates to a hollow plug for blocking a heat exchanger tube, having a given expansion zone expanded into a frictional connection with the heat exchanger tube.

Such hollow plugs have heretofore been frictionally connected with the inner wall of heat exchanger tubes through the use of expansion methods known for fixing heat exchanger tubes in tube plates, such as by hydraulic or explosive action. However, this kind of connection has deficiencies, since it does not withstand various alternating loadings during operation and during testing of the connection between the plug and the tube. An additional reinforcement of the connection or joint by a weld seam is disadvantageous, because the necessary releasability of the plug could then only be attained by expensive machining. In contrast, the expanded plug can easily be released by heating the interior thereof and the shrinking action which is triggered thereby.

European Patent No. 44 982 discloses a hollow plug which is expanded with the aid of a conical mandrel. However, projections on the periphery of the plug lead to damage to the tube wall which is so extensive that it can only be evened out by subsequent machining after the removal of the plug. Permanent deformation of the contact surfaces cannot be ruled out due to the large forces exerted on the plugs and on the tube wall by the conical mandrel which is connected to a hydraulic cylinder. If the plug is to be removed by release of the conical mandrel, it could possibly remain in its expanded position and then could only be removed again by expensive machining such as by milling or drilling, for example, under difficult environmental conditions.

It is accordingly an object of the invention to provide a hollow plug for blocking a heat exchanger tube, which overcomes the hereinafore-mentioned disadvantages of the heretofore-known devices of this general type, which withstands all operating and testing loads, which renders subsequent machining of the inner wall of the tube unnecessary after the removal of the plug, and which is nevertheless easy to install.

With the foregoing and other objects in view there is provided, in accordance with the invention, a hollow plug for blocking a heat exchanger tube, comprising an expansion zone expanded into a frictional or force-locking connection with the heat exchanger tube, an outer surface in the expansion zone having a first part with a relatively greater surface hardness and a second part with a relatively lesser surface hardness, the first part having a greater surface hardness than the heat exchanger tube, the second part having a lesser surface hardness than the heat exchanger tube, and the first part having a relief pattern.

During the expansion operation, the relief pattern only penetrates into the wall of the heat exchanger tube until the deformation of the second part of the expansion zone with the lesser hardness is completed. Experiments have shown that in order to reach a satisfactory frictional or force-locking connection, the deformation travel amounts to about 0.05 to 0.1 millimeters. That is to say, the part of the outer surface with the relief pattern penetrates about 0.01 to 0.05 millimeters into the wall of the heat exchanger tube, and makes an interlocking or form-locking connection therewith. The combination of a frictional or force-locking connection and an interlocking or form-locking connection is simple to install and is able to cope with all loading circumstances. With a depth of penetration of up to a maximum of 0.05 millimeters, the inner surface of the heat exchanger tube is not subjected to any damage worth mentioning, so that subsequent machining after the removal of the hollow plug is not necessary. The removal of the hollow plug is able to be carried out in a simple manner by the shrinking method mentioned initially above, despite the additional interlocking or form-locking connection.

In accordance with another feature of the invention, there is provided a cylindrical part being longer than the expansion zone, the cylindrical part including the expansion zone and a remaining outer surface, the expanded frictional connection having a given deformation travel when expanded, and the expansion zone having an outer surface with a diameter greater than the diameter of the remaining outer surface by the amount of the given deformation travel of the expanded frictional connection. Thus, after the completion of the expansion operation, the remaining outer surface will come into engagement with the inner wall of the tube, while the interlocking or form-locking connection and the frictional or force-locking connection remains in the expansion zone in the desired manner without any disturbing influence due to a hollow plug made longer than the expansion zone.

In accordance with a further feature of the invention, the first part includes a material which is applied and has a hardness and roughness corresponding to that of the first part. The application of the material, which is simple to undertake, thus provides the required characteristics for the necessary interlocking or form-locking connection in advance.

In accordance with a added feature of the invention, the first part is in the form of a slotted spring ring disposed in a recess formed in the cylindrical part, the slotted spring ring having a side facing the inner wall of the heat exchanger tube and having the relief pattern on the side. Due to the slotted spring construction, the ring can be pushed over the outer periphery of the hollow plug and snapped into the recess. The ring is formed in such a way that the inner peripheral surface thereof comes into engagement with the outer peripheral surface of the recess, and therefore the outer periphery of the relief pattern is at least flush with the outer periphery of the second part of the expansion zone having the lesser surface hardness, before the expansion operation.

In accordance with an additional feature of the invention, the spring ring also has another side facing away from the inner wall of the heat exchanger tube and another relief pattern on the other side. This is done in order to form a better interlocking or form-locking connection with the slotted spring ring, after completion of the expansion operation.

In accordance with a concomitant feature of the invention, the first part is in the form of a closely wound spring wire coil disposed in a recess formed in the hollow cylindrical part, the spring wire coil having a spring wire forming the relief pattern. In this case, the spring wire itself forms the relief pattern which penetrates both into the inner wall of the heat exchanger tube and also into the peripheral surface of the recess, to the desired distance.

Other features which are considered as characteristic for the invention are set forth in the appended claims.

Although the invention is illustrated and described herein as embodied in a hollow plug for blocking a heat exchanger tube, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 1 is a fragmentary, diagrammatic, longitudinal-sectional view of a portion of a heat exchanger tube with a hollow plug as well as an expanding tool according to the prior art;

FIGS. 2 and 2a are fragmentary, longitudinal-sectional views each showing a half section of a heat exchanger tube with a hollow plug before and after an expansion operation according to the invention;

Figure 3B:
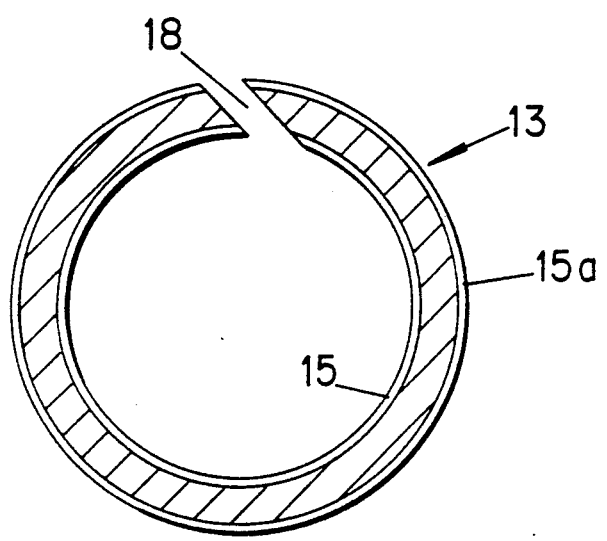

FIGS. 3, 3a, 4 and 4a are views similar to FIGS. 2 and 2a showing other refinements of the embodiments of FIGS. 2, 2a; and FIG. 3b is an enlarged cross-sectional view of the slotted spring ring of FIGS. 3 and 3a.

Referring now to the figures of the drawings in detail and first, particularly, to FIG. 1 thereof, there is seen a longitudinal section of a portion of a heat exchanger tube 1, which is inserted in a tube plate 2 of a non-illustrated steam generator of a nuclear power plant and is secured by a weld seam 3. The tube plate 2 of such a steam generator is penetrated by a plurality of tubes 1. If it is found by repeated tests that a tube 1 is defective, then it must be blocked off by a hollow plug 4 and made into a blind tube. For this purpose, the hollow plug 4 which is provided with a slight play relative to the inner wall of the tube 1 is inserted into the tube up to an abutment 5 thereof. The hollow plug 4 is given a binding expansion which is known from the insertion of tubes into tube plates, by means of a roller tool 6 shown in phantom. It may possibly be necessary to remove the plug during a later overhaul, in order to be able to exchange or repair the defective tube. The fitting and removal of the plug must take place quickly, in order to limit the radiation exposure of the repair staff.

Exemplary embodiments of a plug according to the invention are described with reference to FIGS. 2 to 4.

FIG. 2 is a half section showing the hollow plug 4 in the position thereof which is ready for expansion, but before the expansion operation in the heat exchanger tube 1 which is secured in the tube plate 2 by the weld seam 3. The hollow plug 4 is formed of a hollow cylindrical part 7 having the abutment 5 and a collar 8 projecting therefrom, as well as a conically shaped plug termination or end 9. The hollow plug has been exaggerated with regards the wall thickness thereof, in order to be able to better show the shape of the outer surface. The collar 8 projects by about 0.05 to 0.1 millimeter beyond the rest of the outer surface of the hollow cylindrical part 7, and has a width of about 10 millimeters. Closely below the collar 8 is a layer 10 applied to the hollow cylindrical part 7 which is made of a material that has a greater surface hardness than the collar 8, which likewise projects 0.05 to 0.1 millimeters above the rest of the outer surface of the hollow cylindrical part 7, and which has a width of about 6 millimeters. The outer surface of the layer 10 is provided with a relief pattern, which has a pattern depth of 0.01 to 0.05 millimeters. The collar 8, which has a surface with a lesser degree of hardness than the inner wall of the tube 1, forms an expansion zone together with the layer 10 which is acted upon by the expanding tool 6 indicated in FIG. 1. The layer 10 forms a first part and the collar 8 forms a second part of the expansion zone. In the expansion operation, the material mass of the collar 8 is crushed so that it is practically no longer present. The change in the yield point in the material of the hollow cylindrical part resulting from the crushing, simultaneously produces an enhancement of the force-locking or frictional connection between the hollow plug and the heat exchanger tube 1. A force-locking connection is one which connects two elements together by force external to the elements, as opposed to a form-locking connection which is provided by the shapes of the elements themselves. During the expansion operation, the relief pattern of the layer 10 which has a greater hardness than the inner wall of the tube 1, penetrates into the inner wall of the tube 1 by a distance (namely 0.01 to 0.05 millimeters) which is predetermined by the deformation operation of the collar 8. The depth of penetration, which provides the form-locking connection or interlocking joint, is indicated by a distance or dimension 11 in FIG. 2a, which represents a half section after the expansion operation is completed. A substantial part of the force-locking or frictional connection is indicated by a zone or dimension 12. The force-locking or frictional connection can no longer be recognized in FIG. 2a, because the collar 8 has flowed or travelled into the outer surface of the hollow cylindrical part 7.

In FIGS. 3 and 4 the part of the expansion zone provided with a greater surface hardness has a different shape, but the structure is otherwise the same as in FIG. 2.

According to FIG. 3, a spring ring 13 which has the same degree of hardness as the layer 10 in FIG. 2 is disposed directly adjacent the collar 8. The outer surface of the spring ring 13 is provided with a slot 18 shown in FIG. 3b, so that it can be pushed over the collar 8 and can be introduced into a recess 14 formed in the hollow cylindrical part 7. In the unstressed condition, the slotted spring ring 13 comes into engagement with the circumferential surface of the hollow cylindrical part 7 at the recess 14. In the axial direction, there is play of a few tenths of a millimeter between the spring ring 13 and the recess 14. The spring ring has a wall thickness of about 0.3 millimeters, and the outer surface thereof is provided with a relief pattern 15 with a pattern depth of 0.01 to 0.05 millimeters. Before the expansion, the spring ring 13 projects as far beyond the rest of the outer surface of the hollow cylindrical part 7 as the collar 8 (0.05 to 0.1 millimeters). In this exemplary embodiment, the collar 8 and the spring ring 13 form the expansion zone. The expansion takes place in the same manner as explained with reference to FIG. 2. According to FIG. 3a, which shows a half section of the hollow plug after completion of expansion, the depth of penetration (0.01 to 0.05 millimeters) of the form-locking or interlocking connection is again indicated by the distance or dimension 11, while the force-locking or frictional connection between the collar 8 and the tube 1 is indicated by the zone or dimension 12. In order to achieve better locking of the spring ring 13 relative to the recess 14, the side of the spring ring 13 facing away from the tube 1 can likewise be provided with a relief pattern 15a. This pattern is then pressed into the circumferential surface of the hollow cylindrical part 7 at the recess 14 during the expansion operation. The total thickness of the spring ring 13 must therefore be increased by the depth of this penetration.

According to FIG. 4, a closely wound spring wire coil or winding 16 is disposed adjacent the collar 8, instead of the layer 10 according to FIG. 2 or the spring ring 13 according to FIG. 3. The spring winding can be easily pushed over the collar 8 and locked in a recess 17. The chosen diameter of the wire of the coil amounts to about 0.3 millimeters. The coil projects beyond the rest of the outer surface of the hollow cylindrical part 7 to the same extent as the collar 8. After the expansion operation shown in FIG. 4a, the wire 16 has penetrated both into the tube 1 and into the hollow plug 4, and forms the form-locking or interlocking connection of the expansion zone (indicated by the distance 11). As in the other illustrated embodiments, the force-locking or frictional connection is provided by the collar 8, as indicated by the zone or dimension 12 in FIG. 4a. A simple removal of the hollow plug is possible with the shrinkage method mentioned initially above, despite the additional controlled-distance force-locking or interlocking connection, since all the elements forming the harder part of the expansion zone take part in the shrinkage movement.

The foregoing is a description corresponding in substance to German Application P 37 16 328.0-16, dated May 15, 1987, the International priority of which is being claimed for the instant application, and which is hereby made part of this application. Any material discrepancies between the foregoing specification and the aforementioned corresponding German application are to be resolved in favor of the latter.

We claim:

1. Hollow plug for blocking a heat exchanger tube of a heat exchanger disposed in a tube plate, comprising a body having an expansion zone being expanded into a frictional connection with the heat exchanger tube and being fixed relative to the heat exchanger tube during operation of the hollow plug and the heat exchanger, an outer surface in said expansion zone having a first part with a relatively greater surface hardness and a second part with a relatively lesser surface hardness, said first part having a greater surface hardness than the heat exchanger tube, said second part having a lesser surface hardness than the heat exchanger tube, and said first part having a relief pattern.

2. Hollow plug according to claim 1, including a cylindrical part being longer than said expansion zone, said cylindrical part including said expansion zone and a remaining outer surface, said expanded frictional connection having a given deformation travel when expanded, and said expansion zone having an outer surface with a diameter greater than the diameter of said remaining outer surface by the amount of said given deformation travel of said expanded frictional connection.

3. Hollow plug according to claim 1, wherein said first part includes a material with a hardness and roughness corresponding to that of said first part.

4. Hollow plug according to claim 2, wherein said first part is in the form of a slotted spring ring disposed in a recess formed in said cylindrical part, said slotted spring ring having a side facing the inner wall of the heat exchanger tube and having said relief pattern on said side.

5. Hollow plug according to claim 4, wherein said spring ring also has another side facing away from the inner wall of the heat exchanger tube and another relief pattern on said other side.

6. Hollow plug according to claim 2, wherein said first part is in the form of a closely wound spring wire coil disposed in a recess formed in said hollow cylindrical part, said spring wire coil having a spring wire forming said relief pattern.

7. Hollow plug according to claim 1, wherein said expansion zone and the heat exchanger tube are deformed into engagement with each other.

8. Hollow plug according to claim 1, including a substantially cylindrical part having said expansion zone and a remaining outer surface integral with said outer surface in said expansion zone.

9. Hollow plug according to claim 1, including an end closing said substantially cylindrical part.

* * * * *